Nov. 26, 1957  S. W. KOENIG, JR  2,814,309
HYDRAULIC CONTROL VALVE
Filed March 23, 1955  4 Sheets-Sheet 1
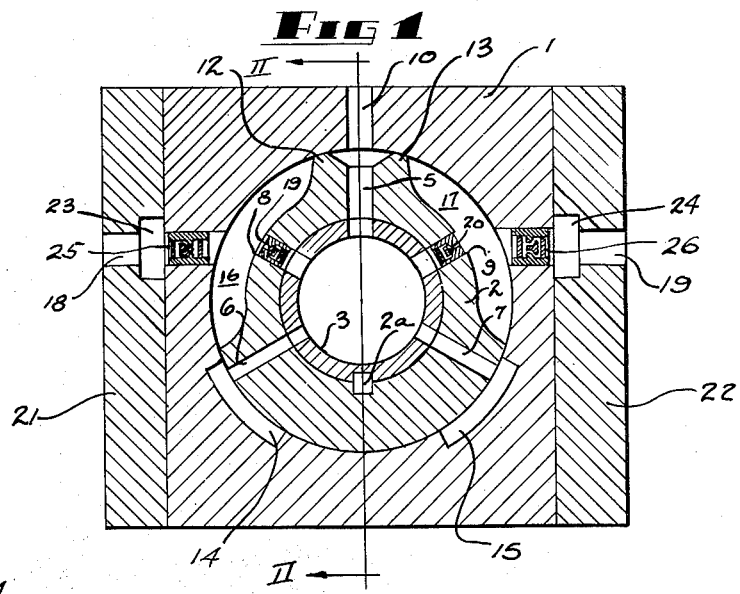
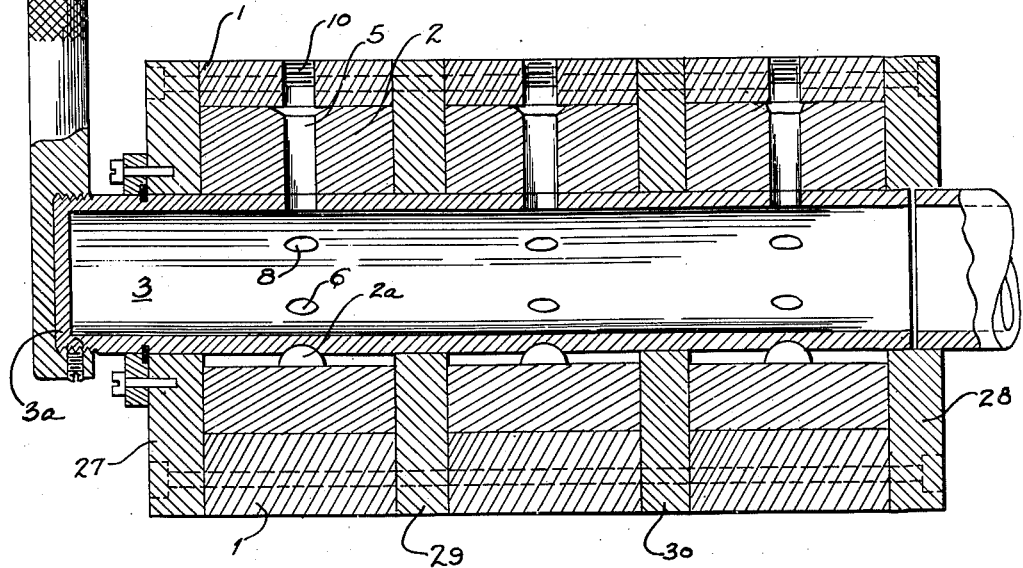
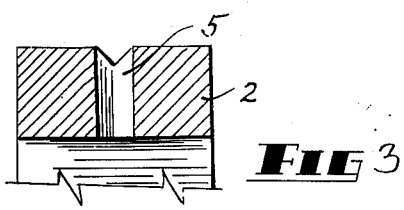
INVENTOR.
SIMON W. KOENIG JR.
BY
ATTORNEY Nov. 26, 1957 S. W. KOENIG, JR 2,814,309
HYDRAULIC CONTROL VALVE
Filed March 23, 1955 4 Sheets-Sheet 2

INVENTOR.
SIMON W. KOENIG JR
BY
William J. Ruano
ATTORNEY

INVENTOR.
SIMON W. KOENIG JR.
BY
ATTORNEY

Nov. 26, 1957  S. W. KOENIG, JR  2,814,309
HYDRAULIC CONTROL VALVE

Filed March 23, 1955  4 Sheets-Sheet 4

INVENTOR.
SIMON W. KOENIG JR.
BY
*William J. Ruano*
ATTORNEY

United States Patent Office

2,814,309
Patented Nov. 26, 1957

2,814,309

HYDRAULIC CONTROL VALVE

Simon W. Koenig, Jr., Pittsburgh, Pa.

Application March 23, 1955, Serial No. 496,217

9 Claims. (Cl. 137—624)

This invention relates to a hydraulic control valve and, more particularly, to improvements in a single or multiple hydraulic control valve useful for controlling hydraulic cylinders or motors.

An outstanding disadvantage of well-known types of valves for controlling the operation of hydraulic motors has been their cumbersome construction and high cost of manufacture. Another disadvantage has been that such valves do not provide suitable control, particularly suitable throttling action, in order to obtain the desired speed and operating characteristics of the hydraulic motor to be controlled. An outstanding disadvantage of past attempts to use more than one valve has been that the installation of considerable piping has been necessary, as well as the requirement of a plurality of separate valves for accomplishing the desired control function of the hydraulic motor.

An object of the present invention is to provide a novel hydraulic control valve which is devoid of the above named disadvantages and which is of relatively simple and inexpensive construction, involving a minimum number of simple parts, requiring low maintenance costs and insuring the utmost of reliability in operation.

A further object of this invention is to provide a hydraulic control valve having three positions (neutral, forward and reverse), and which is of the four-way type with throttling action built in a single valve construction and which is provided with relief or safety valves and check valves to insure safety in operation at all times.

A still further object of this invention is to provide a multiple hydraulic control valve comprising a plurality of stacked single valves built within a single valve housing, all of which valves are operated by a single control lever, and which valves may be sequentially operated to provide various control movements, as well as a wide range of speed control, of a hydraulic motor.

Other objects and advantages of the present invention will become apparent from a study of the following description taken with the accompanying drawing, wherein:

Figure 1 is a transverse cross-sectional view of a four-way, three-position hydraulic control valve embodying the principles of the present invention.

Figure 2 is a longitudinal cross-sectional view taken along line II—II of Figure 1 and showing a multiple hydraulic control valve assembly embodying a plurality of valves of the construction shown in Figure 1;

Figure 3 is a fragmentary, cross-sectional view of a modified shape of inlet opening in the rotor which may be used instead of that shown in Figures 1 and 2;

Figures 8a to 13a, inclusive, are diagrammatic representations of modified form of valve constructions corresponding to the modified valves shown in Figures 8b to 13b, respectively, and illustrating how flow characteristics may be varied in the valve by slight changes in the valve construction.

Figure 4:
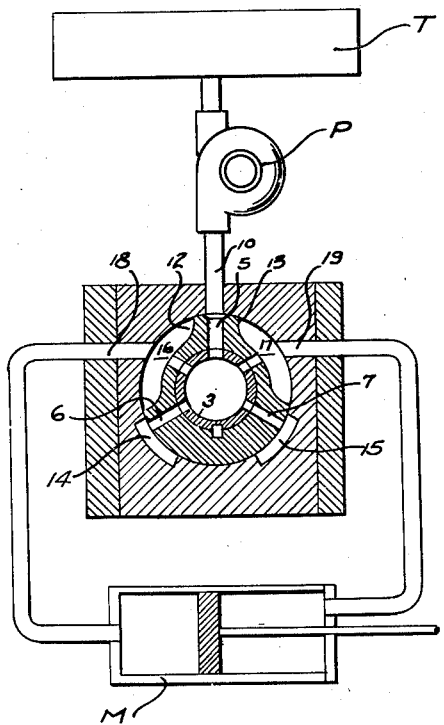
Figure 4 shows a hydraulic control system for controlling a hydraulic piston by the use of a single unit control valve.
Figure 5:
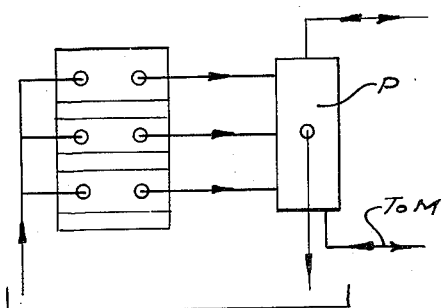
Figure 5 is a schematic showing of a hydraulic control system for controlling a hydraulic piston or other hydraulic motor but wherein a multiple unit control valve, as shown in Figure 2, is used instead of the single unit control valve used in the system shown in Figure 4.

Referring more particularly to Figures 1, 2 and 4 of the drawing, numeral 1 denotes a main body of the valve which is provided with a cylindrical bore to provide a hollow casing in which is rotatably mounted a valve or rotor 2 which is keyed by means of a suitable key 2a to a hollow shaft or pipe 3 which is in communication with a reservoir or tank T (see Fig. 4). The hollow shaft 3, as shown more clearly in Figure 2, has a closed end 3a onto which is threadedly secured a handle and indicating control arm 4 which is adapted to rotate the hollow shaft 4 about its axis in either direction to obtain reversal of the controlled hydraulic cylinder or motor M (see Fig. 4).

The valve 2 is provided with a plurality of radially extending ports 5, 6, 7, 8 and 9 which are in registry with corresponding ports formed in the hollow shaft 3. An inlet port 5 connected to hydraulic pump P extends radially through the rotor 2 and is adapted to come into registry with the port 10 formed in the main body 1 to force fluid under pressure such as oil, into the hydraulic motor. At the outer opening of inlet port 5 are projections 12 and 13 which provide a close sliding fit with the inner cylindrical wall of valve body 1 and which prevent liquid flow therethrough in a circumferential direction.

Internal grooves 14 and 15 are provided in valve body 1 to permit oil passage from chambers 16 and 17 to ports 6 and 7, respectively. Discharge and return ports 18 and 19 are provided in valve 2 which are adapted to come into communication with chambers 16 and 17, respectively and which may be connected to opposite chambers of a hydraulic cylinder or hydraulic motor to be controlled.

Relief or safety valves 19 and 20 (see Figure 1b) are provided in the rotor and which are normally closed by a spring 19a and which open only when the pressure in chamber 16 or 17 reaches an abnormally high value so as to force the valves open to permit oil flow through ports 19b into the interior of the rotor 2 and to the tank or reservoir T in communication therewith.

The structure described up to this point relates to a single hydraulic control valve and may be used for controlling the operation of a piston or hydraulic motor M simply by connecting the discharge and return ports 18 and 19 to opposite chambers of a piston in a hydraulic cylinder M, for example, as shown in Figure 4.

The operation of a single hydraulic control valve is as follows. Assume that the rotor 2 is in the neutral position as shown in Figures 1 and 4, that is, with inlet port 10 in registry with port 5 so as to permit the flow of oil from the pump P into the interior of rotor 2, thence directly to the reservoir T. Projections 12 and 13 closely fitted to the inner wall surface of rotor 2 prevent the oil from entering either chamber 16 or 17, therefore prevent the flow of oil into or out of the respective cylinders of the hydraulic motor M. Thus the controlled hydraulic piston will be locked in a given position.

When it is desired to effect movement of the piston of the hydraulic motor M to the right, handle 4 is turned in a clockwise direction as viewed in Figures 1 and 4. As the left projection 12 enters the area of inlet opening 10, part of the oil will flow into chamber 16 and through the discharge port 18 to the left cylinder of the controlled hydraulic motor M so as to move the piston to the right. The remainder of the oil will continue to flow from pump P, through ports 10 and 5 to pipe 3 and tank T. Oil from the right cylinder will flow through the return port 19, through chamber 17, internal groove 15, port 7 into rotor 2 and to the reservoir or tank T. Continued rotation of the handle 4 and rotor 2 in a clockwise direction gradually blocks inlet port 5 from the oil stream or path to increase the volume or rate of flow to the cylinder chamber until left projection 12 has passed the area of inlet port 10 at which time full pump discharge flows only through the above described circuit with no flow to the tank T.

If it is desired to reverse the direction of movement of the controlled piston of the hydraulic motor M, that is to move it to the left, the handle 4 is rotated in an opposite or counterclockwise direction. That is, as projection 13 enters the path of inlet port 10, part of the oil will be forced by pump P from the inlet port 10 into chamber 17 thence through the discharge port 17 to the right hydraulic cylinder. Oil from the left cylinder will return to port 18, chamber 16, internal groove 14, port 6, pipe 3 to the reservoir, thus providing reverse flow through the hydraulic motor and consequently reverse movement, that is, to the left, of the controlled piston or other controlled element. And after the right hand projection 13 passes inlet port 10, the full pressure of the pump will be applied to the hydraulic cylinder or motor causing a greater speed of movement of the piston because of the increased volume of flow. It will be understood that by suitable shaping of the mouth or outlet of port 5 so as to make it shallower or wider, different speed or control characteristics of the hydraulic motor may be obtained.

Figure 1A:
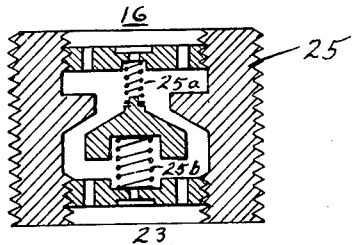
Figures 1a and 1b are enlarged sections of the check and relief valves in Figure 1.
Figure 1B:
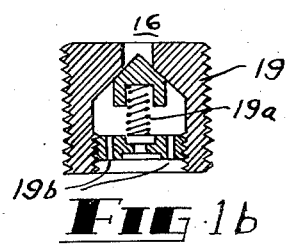

Figure 2 shows a multiple unit valve construction and shows how a number of valves of the construction shown in Figure 1 may be stacked together to form a multiple valve assembly, as shown more clearly in Figure 2. For this purpose it is necessary to add manifold plates 21 and 22 (see Figure 1 and not needed for a single valve unit) which include header openings 23 and 24 extending longitudinally of plates 21 and 22 and of the multiple stacked valves to provide common discharge or return ports for all of the stacked valves. It is found desirable to provide, in the respective discharge and return ports of the respective valves leading to the common discharge and return ports, check valves 25 and 26 (see Fig. 1a) which are normally held open by springs, such as 25a and 25b and which close in a radially inward direction as a consequence of a build up or increase in pressure of the controlled system, greater than the spring differential settings.

As shown more clearly in Figure 2 any number of single valve units may be stacked, there being three of such units stacked for purposes of illustration. End plates 27 and 28 and intermediate plates 29 and 30 are provided which are all stationarily mounted in the same manner as the main body 1. It will be noted that the shapes of the various valve inlet openings which are connected to separate pumps are different, that is, the spacing between projections 12 and 13 of the various valve units are different. This is done so that as one valve connects a pump to the hydraulic motor, the next valve will connect its pump to the hydraulic motor shortly thereafter, and the third valve will do so still later, so as to provide sequential flow from the respective pumps and thus obtain progressively increasing volume of flow through the controlled hydraulic cylinder or motor and thereby obtain progressive increase in speed thereof. Of course, by shaping the inlet openings differently, different control or speed characteristics may be obtained for the controlled hydraulic motor.

Of course, instead of stacking, separate valves were desired, these may be connected in the same manner as the respective stacked valves.

The rotary multiple valves of the present invention, with different connections, may be employed for controlling a multiple place hydraulic motor to achieve either series or parallel operation of the motor.

Figure 6:
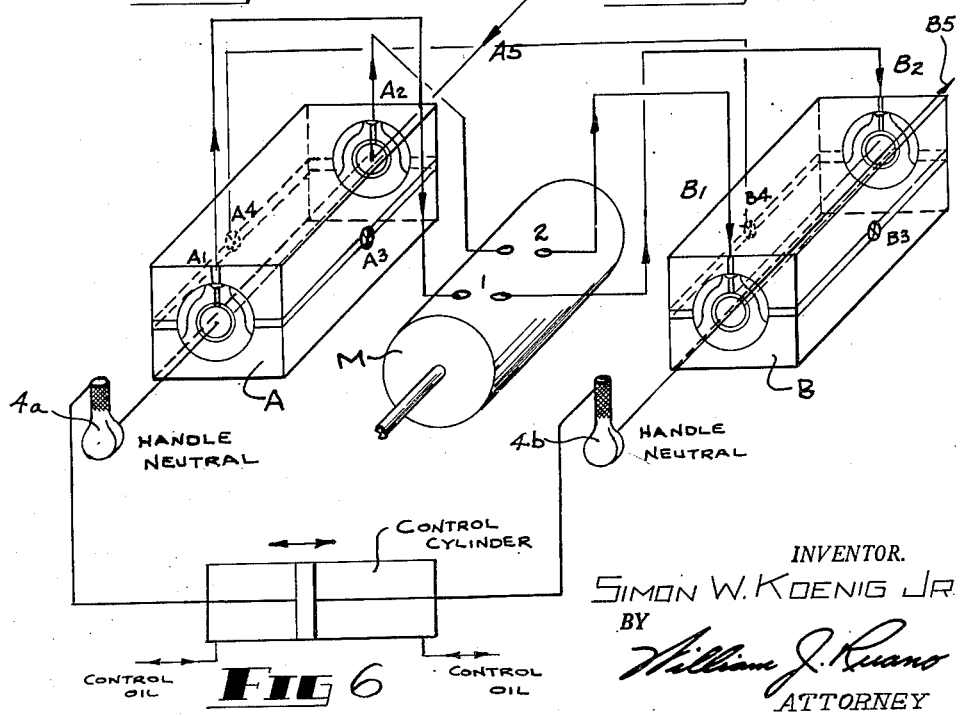
Figure 6 is a somewhat schematic view showing a hydraulic control system using two multiple valve assemblies through which the direction of flow of fluid is the reverse of that shown in Figures 1 and 2, and which are connected so as to provide parallel operation or control of a hydraulic motor.
Figure 7:
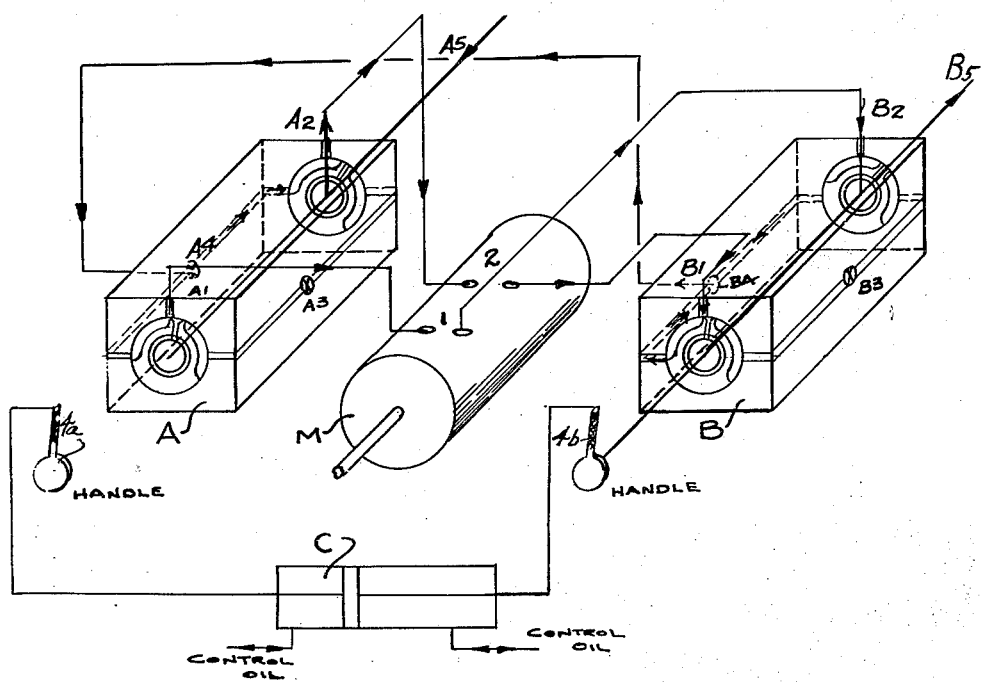
Figure 7 is a schematic view showing a hydraulic control system and illustrating how multiple unit control valves may be connected to obtain series operation of a hydraulic motor.

Figure 6 is a schematic diagram showing parallel operation of a multiple place motor and Figure 7 shows series operation of the same motor obtained merely as the result of turning of the common control handles and rotors to a different rotor position. As will be noted in the particular valves used in Figures 6 and 7 the recesses in the valve body are eliminated as well as the internal passages in the rotor. In short, valve shifting is limited to steps, the number being determined by the places of the motor to be controlled.

Referring to Figure 6, and assuming that the valve control handles 4a and 4b are turned to the neutral position of the respective valves, that is, the same position shown in Figure 1, then the following circuit may be traced in Figure 6. Oil will flow through the pipe 3 to inlet A5 (all references to multiple valve A are prefixed by letter A) and the oil flow will be split and will flow upwardly through ports A1 and A2, to pump places M1 and M2, thence downwardly into ports B1 and B2, port B5 to pipe 3 through the outlet. Thus there is equal flow and pressure on each of the motor places 1 and 2. The side ports A3 and B3 (corresponding to ports 18 or 19) are plugged for this type operation.

While handles 4a and 4b may be operated manually either separately, or by a common control mechanical element, they are more usually operated by means of a control cylinder C, which is conventional in the art, and which affords power control, or may be turned by any power operated device, such as selsyn motors and the like (not shown).

As shown in Figure 7, when series operation of motor M is desired, handles 4a and 4b are both rotated slightly in a clockwise direction, either manually or by control cylinder C to the position shown. At this position, vertical ports A1 and B1 are open and vertical ports A2 and B2 are closed to the central pipe 3 (path A5 and B5). The flow of oil may now be traced from inlet port A5, through pipe 3, port A1 to motor place 1, thence crossing over to port B2, through the left header B4, outwardly into the left header A4, thence rearwardly and upwardly through A2, motor place 2, then downwardly through port B1, and finally out through the central pipe 3 and port B5. The right header outlet A3 and B3 are plugged for the above described series operation. Thus all the pressure is used on the first motor place, and full flow of oil causes double the speed as compared to parallel operation in Figure 6, but the torque is cut in half as compared to that in parallel operation. Spent oil is supplied to the second motor place to prevent cavitation. The piping between the pump and motor is limited to two lines, yet reversing and variable speed through selective speed ranges are achieved.

Various modifications of the valve construction of Figure 1 can be made to obtain different types of flow for different ssytems, merely by slight modifications of the shape of the rotor. The different flow characteristics may be best exemplified by JIC symbols, such as shown in Figures 8a to 13a inclusive. It will be noted that P represents a pump and T represents a tank or reservoir, whereas numerals 1 and 2 denote the same ports as ports 18 and 19 in Figures 1 and 4.

Figure 8A:
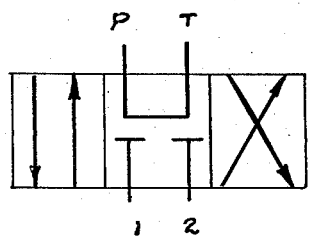
Figure 8B:
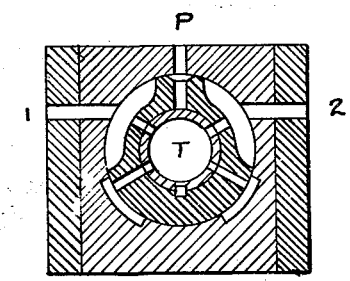

Referring to Figure 8a the flow diagram represents that of the valve shown in Figure 8b, which, in turn, is the same as that shown in Figures 1 and 4.

Figure 9A:
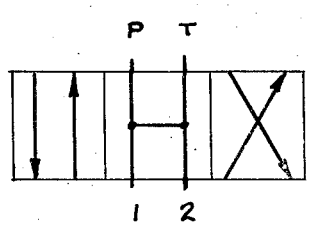
Figure 9B:
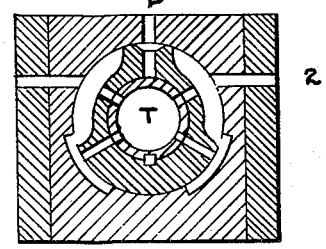
Figure 10A:
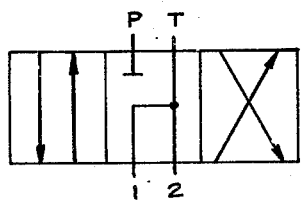
Figure 10B:
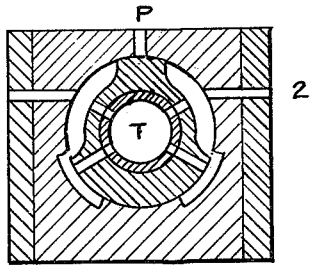
Figure 11A:
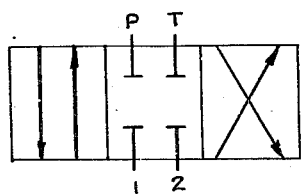
Figure 11B:
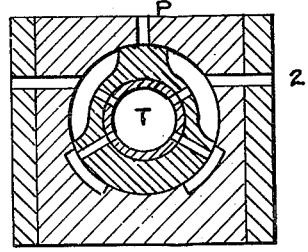
Figure 12A:
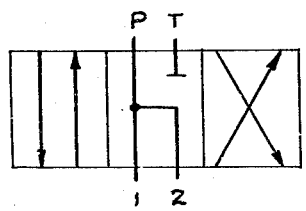
Figure 12B:
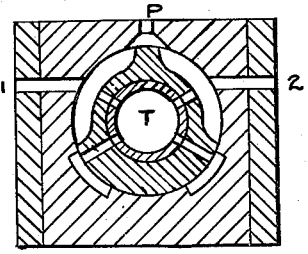
Figure 13A:
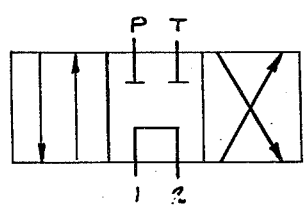
Figure 13B:
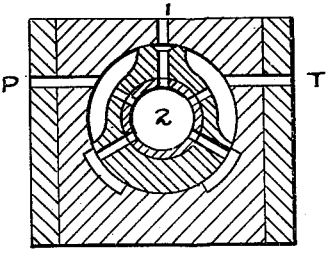

Likewise referring to Figures 9a and 9b it will be noted that by changing the shape of the rotor so as to prevent blocking of passages 1 and 2 in a neutral position, a continued flow will be obtained to both ports 1 and 2 as represented in Figure 9a. Likewise in Figures 10a and 10b a further modification in the rotor (omission of port 5) to obtain a different flow through the valve is illustrated. Similarly in Figures 11a and 11b, 12a and 12b and 13a and 13b, all of which figures are self-explanatory, show other different valve constructions for obtaining other flow characteristics desired.

It will be apparent that various modifications of the above described invention can be made. For example, control of the handles 4a and 4b may be manual, by automatic air or hydraulic pilot, solenoid, selsyn motors or other types of control devices. Moreover the mountings may be varied, for example if the plates 21 and 22 are omitted from the construction shown in Figure 2, the multiple valve assembly may be used essentially as three separate, sequentially operated valves, each connected to a separate pump, but all valves operated by a common control handle 4. The three valves going from left to right in Figure 2 may be cut off from the reservoir in that order. Clockwise rotation would cause discharge from the respective left outlet valves, going from left to right, in that order, whereas reverse or counterclockwise rotation will cause flow from the right outlet valves, in the order going from left to right. Any number of the previously described neutral rotor positions may be used, as desired. Moreover external valves may be built in the side plates 21 and 22 for specific applications, as required, thereby eliminating the necessity for external piping and fittings, other than the two lines to the work mechanism, cylinders or motors. These can be located at any rotor section for individual control, or can be used for the single discharge line control. The valve construction embodying the present invention permits draining of all ports and openings into pipe 3 connected to the reservoir.

Thus it will be seen that I have provided an efficient hydraulic control valve of either single or multiple construction, which valve will effect reversing and selective throttling action of a controlled hydraulic motor of a single throttle, furthermore I have provided a hydraulic control value including a rotor having a center tubular opening connected to a reservoir, the rotor having projections and ports so arranged that fluid under pressure from a pump may be connected either directly to the reservoir or directly to one side or to an opposite side of a hydraulic cylinder, or the fluid may flow from the pump through parallel paths into the reservoir simultaneously to one of said sides of the cylinder to obtain throttling action, also which valve may be stacked construction to form a multiple unit useful in hydraulic control systems, either alone or with other units to afford an amazing reduction in piping and permitting a wide variety of control functions, including selective series or parallel operation of a controlled hydraulic motor; furthermore I have provided a hydraulic control valve embodying built in safety valves and check or relief valves so as to prevent occurrence of abnormal pressures and so as to insure operation of the system irrespective of pressure changes and leaks within the valve.

While I have illustrated and described certain specific embodiments of my invention, it will be understood that these are by way of illustration only, and that various changes and modifications may be made within the contemplation of my invention and within the scope of the following claims.

I claim:

1. A hydraulic control valve comprising a valve body having an inlet port and having a cylindrical bore, a rotor rotatably mounted in said bore with parts of its circumferential portion slidably fitted therein, said rotor having a longitudinal central exhaust opening and having a radially extending port communicating with said central exhaust opening, said rotor port having a radially outwardly flared inlet portion and being adapted to come into registry with said inlet port so as to connect it to said central exhaust opening, projections extending radially outwardly of said rotor on opposite sides of said radially outwardly flared inlet portion for blocking communication between said inlet and rotor ports when they are out of registry beyond a predetermined angle, cut out portions on said rotor circumferential portion immediately adjacent said projections to form chambers between the rotor and valve body, whereby upon rotation of said rotor in one direction or an opposite direction, communication will be established between said inlet port and one of said chambers and will be initially continued for a very short while between said inlet port and said rotor port to effect throttling action, said rotor being provided with two additional, radially extending ports, arcuate grooves extending circumferentially in the inner wall of said bore for communicating with said ports, whereby upon predetermined rotation of the rotor so that said ports are not in exact registry, communication will be established between either of said respective chambers and one of said additional ports through the corresponding groove to provide communication between the chamber and said tubular central exhaust opening.

2. A hydraulic control valve comprising a valve body having an inlet port and having a cylindrical bore, a rotor rotatably mounted in said bore with parts of its circumferential portion slidably fitted therein, said rotor having a longitudinal central exhaust opening and having a radially extending port communicating with said central exhaust opening, said rotor port having a radially outwardly flared inlet portion and being adapted to come into registry with said inlet port so as to connect it to said central exhaust opening, projections extending radially outwardly of said rotor on opposite sides of said radially outwardly flared inlet portion for blocking communication between said inlet and rotor ports when they are out of registry beyond a predetermined angle, cut out portions on said rotor circumferential portion immediately adjacent said projections to form chambers between the rotor and valve body, whereby upon rotation of said rotor in one direction or an opposite direction, communication will be established between said inlet port and one of said chambers will be initially continued for a very short while between said inlet port and said rotor port to effect throttling action and relief valves mounted on said rotor connected between said central exhaust opening and said chambers whereby abnormal pressure in the chambers will effect openings of the valves to discharge fluid into said central exhaust opening.

3. A hydraulic control valve comprising a valve body having an inlet port and having a cylindrical bore substantially at right angles thereto, a rotor having a radially extending inlet port and having projections extending from opposite sides of the outer end of said inlet port which are slidable on said bore to prevent flow of fluid from said valve body inlet port in a direction circumferentially of said bore, said rotor having two cut out portions at the surface thereof adjacent said respective projections and constituting chambers for connection to a controlled hydraulic system and having a cylindrical segment with radially extending holes, said valve body having separate spaced arcuate grooves along the circumference of the inner wall of said bore which are so positioned as to communicate with said respective grooves and which extend about a sufficient arcuate distance so that while either of said radially extending holes is in communication with one of said chambers, the other will be in communication with one of said arcuate grooves which is most remote therefrom for providing a flow path between one of said chambers, and a tubular central exhaust opening in the rotor upon predetermined rotation of said rotor.

4. A hydraulic control valve comprising a body having an inlet port, said valve body having discharge and intake ports, said valve body including a rotor having a tubular central longitudinal exhaust opening and having a plurality of radially extending ports for connecting said central exhaust opening to chambers formed by arcuate cut out surface portions of said rotor adjacent said body, which are in communication with said discharge and intake ports, said rotor having a radial inlet opening for selectively connecting said inlet port either to said tubular central opening or to one of said chambers and having a by-pass in said radial inlet opening for providing initial parallel communication between said inlet port and said central exhaust opening, whereby progressive increase in pressure is provided in said respective chambers, and relief valves provided in said rotor to discharge, into said central exhaust opening, abnormal pressures developed in said chambers.

5. A multiple hydraulic valve comprising a stationary valve body having a longitudinal cylindrical bore, a tube having a plurality of rotors rigidly mounted thereon and slidably rotatable in said bore, said rotors being in spaced relationship with stationary partitions therebetween so as to provide, in effect, separate valves separated by said partitions, a handle connected to the end of said tube for rotating all of said rotors simultaneously, said valve body having a plurality of inlets, each of said rotors having an inlet port adapted to come into registry with one of said inlets, and having two outlet ports, whereby rotation of said handle in opposite direction effects selective connection between said inlets and one of said outlet ports.

6. A hydraulic valve as recited in claim 5 together with a pair of stationary plates, each having a longitudinal header opening for interconnecting corresponding outlet ports together to provide two common outlets for the two groups of outlet ports.

7. A hydraulic valve as recited in claim 5 wherein said rotor inlet ports are in radially staggered relationship so that turning of said handle will effect sequential communication between said inlets and said rotor inlet ports.

8. A hydraulic valve as recited in claim 5 wherein the outer openings of said rotor inlet ports are of different widths so as to obtain progressively different throttling action through the respective inlet ports.

9. A hydraulic valve as recited in claim 5 together with a pair of stationary plates mounted on the sides of said valve body, each having a longitudinal header opening for interconnecting corresponding outlet ports together to provide two common outlets for the two groups of outlet ports and normally open check valves located in said valve body between said outlet ports and said header openings for closing communication therebetween upon attainment of abnormal pressure in said head opening.

References Cited in the file of this patent

UNITED STATES PATENTS

| | | |
|---|---|---|
| 1,510,129 | Argy | Sept. 30, 1924 |
| 1,538,167 | Chappell et al. | May 19, 1925 |
| 2,103,530 | Henry | Dec. 28, 1937 |
| 2,127,679 | Dudley | Aug. 23, 1938 |
| 2,360,987 | Temple | Oct. 24, 1944 |
| 2,384,760 | Matulionis | Sept. 11, 1945 |
| 2,398,542 | Light | Apr. 16, 1946 |
| 2,552,848 | Gabriel et al. | May 15, 1951 |